Patented Aug. 27, 1929.

1,726,266

UNITED STATES PATENT OFFICE.

FRITZ HESS, OF HOFHEIM-ON-THE-TAUNUS, GERMANY, ASSIGNOR TO GENERAL ANILINE WORKS, INC., OF NEW YORK, N. Y., A CORPORATION OF DELAWARE.

AZO DYESTUFFS.

No Drawing. Application filed March 30, 1928, Serial No. 266,101, and in Germany April 4, 1927.

My present invention relates to azo dyestuffs, more particularly to dyestuffs of the following general formula:

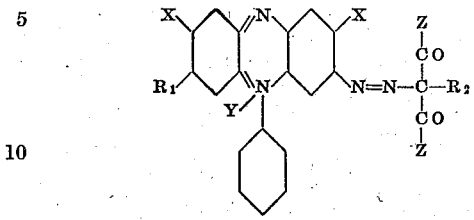

wherein X stands for hydrogen or alkyl, Y for any acid residue, Z for any monovalent substituent particularly for one of the groups alkyl, aralkyl, aryl, oxyalkyl, NH-aryl, $R_1$ for $NH_2$, NH-alkyl or $N\genfrac{}{}{0pt}{}{\text{alkyl}}{\text{alkyl}}$ and $R_2$ for hydrogen or alkyl.

I have found that by coupling the diazo compound of a safranine, advantageously in an acetic solution, with a compound containing the group —CO—CH—CO—, there are obtained dyestuffs, which dye silk and cotton mordanted with tannic acid valuable shades. By using for instance tolusafranine as diazo component, beautiful claret-red tints are produced such as have hitherto not been obtained with any of the known safranine-azo-dyestuffs.

When using a safranine of the type of the dialkyl-safranines, violet-black to greenish-black dyestuffs are obtained which are likewise capable of dyeing silk and cotton mordanted with tannic acid.

Owing to the shades they yield and their solubility, a number of salts of these dyestuffs are distinguished by their excellent copying power and are, therefore, particularly suitable for the manufacture of copying materials, such as for instance copying pencils, copying inks, copying printing-pastes, typewriter-ribbons and the like.

The following examples illustrate my invention, but they are not intended to limit it; the parts are by weight:

1. 10.5 parts of tolusafranine are dissolved in 1400 parts of water and this solution is diazotized at about 10° C. with 15 parts of hydrochloric acid (equivalent 120) and 2 parts of nitrite of 100 per cent strength. After acidifying the diazo solution by means of 12 parts of anhydrous sodium acetate, a solution of 4 parts of acetylacetone in 10 parts of alcohol is added thereto. The coupling is complete after one hour and the mass is salted with 8 to 10 per cent of sodium chloride. The claret-red dyestuff which is thus obtained with a yield of 10 parts, is filtered and dried at 50° C. It has the following formula:

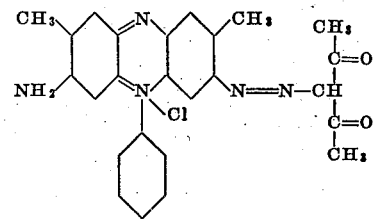

In an appropriately modified manner claret-red dyestuffs are obtained by coupling diazotolusafranine with acetic acid ester, or malonic acid ethyl ester, or aceto-acetic-ortho-toluidide or aceto-acetic-xylidide.

2. 12 parts of diethylsafranine are dissolved in 700 parts of water, and this solution is diazotized at about 10° C. with 15 parts of hydrochloric acid (equivalent 120) and 2 parts of nitrite of 100 per cent strength. The diazo solution is acidified with 12 parts of anhydrous sodium acetate and mixed with a solution of 6 parts of acetoacetic anilide in 15 parts of alcohol.

The coupling is complete after several hours. The greenish-black dyestuff thus obtained is precipitated by means of 15 per cent of sodium chloride, if required while adding a small quantity of zinc chloride, then filtered and dried at 50° C. Its yield amounts to 21 parts and it has the following formula:

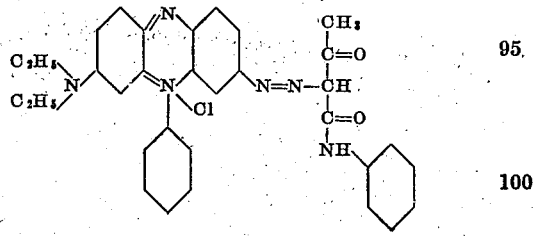

In an appropriately modified manner there is obtained by coupling diazodiethylsafranine with:

Acetic acid ester, a blackish-violet.
Methylacetoacetic ester, a bluish-black.
Malonic acid-ethylester, a blackish-violet.
Acetylacetone, a blackish violet.
Benzoylacetone, a blackish violet.
Acetoacetic - ortho - toluidide, a greenish-black.
Acetoacetic - para - toluidide, a greenish black.
Acetoacetic xylidide, a greenish black.
Acetoacetic-aminoanisol, a reddish black.

If the dyestuffs are intended to be used for the manufacture of copying materials, they must be isolated in another manner. This may be done for instance as follows:

When the coupling is finished, the solution is rendered alkaline by the addition of sodium carbonate, whereby the base of the dyestuff is precipitated and can be filtered. The paste is then acidified, for instance by the addition of an acetate, and dried at 50° C.

I claim:

1. As new products, the dyestuffs of the following general formula:

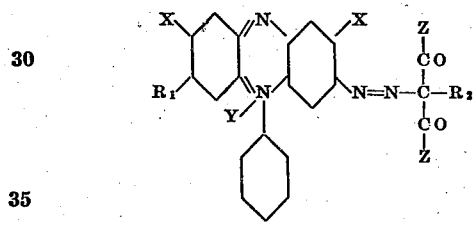

wherein X stands for hydrogen or alkyl, Y for any acid residue, Z for any monovalent substituent, $R_1$ for $NH_2$, NH-alkyl or N(alkyl)(alkyl)

and $R_2$ for hydrogen or alkyl, being brownish-red to black powders, soluble in water to bluish-red or blackish-violet to greenish-black solutions and dyeing well cotton and silk.

2. As new products, the dyestuffs of the following formula:

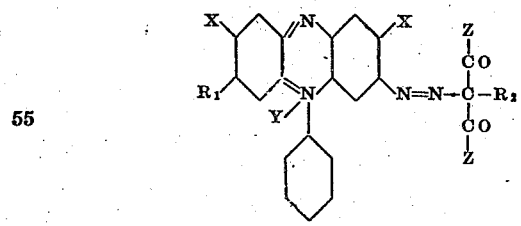

wherein X stands for hydrogen or alkyl, Y for any acid residue, Z for alkyl, aralkyl, aryl, oxyalkyl, NH-aryl, $R_1$ for $NH_2$, NH-alkyl or N(alkyl)(alkyl)

and $R_2$ for hydrogen or alkyl, being brownish-red to black powders, soluble in water to bluish-red or blackish-violet to greenish-black solutions and dyeing well cotton and silk.

3. As new products, the dyestuffs of the following formula:

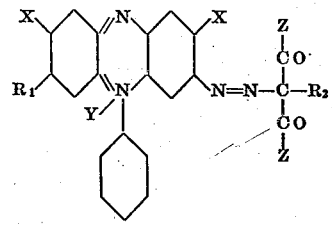

wherein X stands for hydrogen or alkyl, Y for a halogen atom, Z for alkyl, aralkyl, aryl, oxyalkyl, NH-aryl, $R_1$ for $NH_2$, NH-alkyl or N(alkyl)(alkyl)

and $R_2$ for hydrogen or alkyl, being brownish-red to black powders, soluble in water to bluish-red or blackish-violet to greenish-black solutions and dyeing well cotton and silk.

4. As new products, the dyestuffs of the following formula:

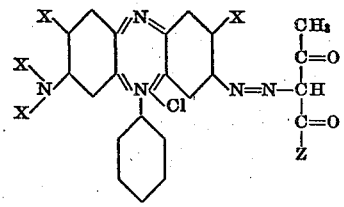

wherein X stands for hydrogen or alkyl and Z for alkyl or NH-aryl, being brownish-red to black powders, soluble in water to bluish-red or blackish-violet to greenish-black solutions and dyeing well cotton and silk.

5. As new products, the dyestuffs of the following formula:

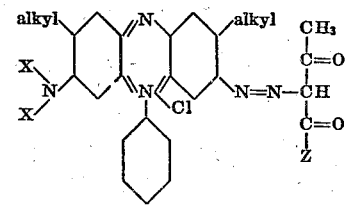

wherein X stands for hydrogen or alkyl and Z for alkyl or NH-aryl, being brownish-red powders, soluble in water to bluish-red solutions and dyeing well cotton and silk.

6. As new products, the dyestuffs of the following formula:

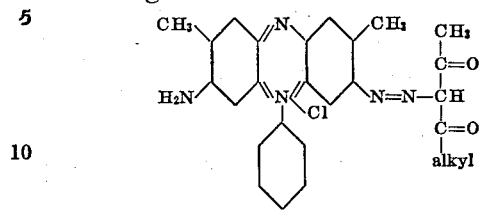

being brownish-red powders, soluble in water to bluish-red solutions and dyeing well cotton and silk.

7. As a new product, the dyestuffs of the following formula:

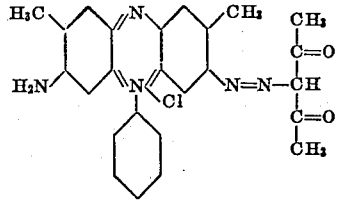

being a brownish-red powder, soluble in water to a bluish-red solution and dyeing well cotton and silk.

In testimony whereof, I affix my signature.

FRITZ HESS.